US012478105B2

(12) United States Patent
Courbat et al.

(10) Patent No.: US 12,478,105 B2
(45) Date of Patent: Nov. 25, 2025

(54) INDUCTIVE HEATER ASSEMBLY WITH TEMPERATURE SENSOR

(71) Applicant: Philip Morris Products S.A., Neuchatel (CH)

(72) Inventors: Jerome Christian Courbat, Neuchatel (CH); Oleg Mironov, Neuchatel (CH); Enrico Stura, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 999 days.

(21) Appl. No.: 17/624,536

(22) PCT Filed: Jul. 2, 2020

(86) PCT No.: PCT/EP2020/068741

§ 371 (c)(1), (2) Date: Jan. 3, 2022

(87) PCT Pub. No.: WO2021/001511

PCT Pub. Date: Jan. 7, 2021

(65) Prior Publication Data

US 2022/0395024 A1 Dec. 15, 2022

(30) Foreign Application Priority Data

Jul. 4, 2019 (EP) .................................... 19184555

(51) Int. Cl.
*H05B 6/06* (2006.01)
*A24F 40/20* (2020.01)
(Continued)

(52) U.S. Cl.
CPC ............ *A24F 40/465* (2020.01); *A24F 40/20* (2020.01); *A24F 40/40* (2020.01); *A24F 40/50* (2020.01);
(Continued)

(58) Field of Classification Search
CPC ........ A24F 40/20; A24F 40/40; A24F 40/465; A24F 40/50; A24F 40/51; H01F 27/30; H05B 6/06; H05B 6/105; H05B 6/36
(Continued)

(56) References Cited

U.S. PATENT DOCUMENTS 5,573,613 A 11/1996 Lunden
10,791,765 B2 * 10/2020 Li .......................... A24F 40/57
(Continued)

FOREIGN PATENT DOCUMENTS

CN 102651575 A 8/2012
CN 104571190 A 4/2015
(Continued)

OTHER PUBLICATIONS

Translation of JP2016164527A, "Temperature Detection Body, and Cable , Coil, and Temperature Detection Device Including The Same", Sep. 8, 2016, by WIPO. (Year: 2016).*
(Continued)

*Primary Examiner* — Quang T Van
(74) *Attorney, Agent, or Firm* — Oblon, McClelland, Maier & Neustadt, L.L.P.

(57) ABSTRACT

An inductive heater assembly for an aerosol-generating device is provided, the assembly including: at least one inductor coil configured to generate a varying magnetic field when a varying electric current flows through the coil; at least one susceptor arranged to be penetrated by the magnetic field generated by the coil to heat the susceptor; at least one temperature sensor arranged to determine a temperature of the susceptor, the temperature sensor includes first and second resistive sensing elements, the first element being connected to the second element, and the first element being positioned relative to the second element such that a current induced in the first element by the magnetic field opposes a
(Continued)

current induced in the second element by the magnetic field. An aerosol-generating device including the inductive heater assembly, control circuitry, and a power source, is also provided.

13 Claims, 5 Drawing Sheets

(51) Int. Cl.

| | |
|---|---|
| ***A24F 40/40*** | (2020.01) |
| ***A24F 40/465*** | (2020.01) |
| ***A24F 40/50*** | (2020.01) |
| ***A24F 40/51*** | (2020.01) |
| ***H01F 27/30*** | (2006.01) |
| ***H05B 6/10*** | (2006.01) |
| ***H05B 6/36*** | (2006.01) |

(52) U.S. Cl.
CPC .............. *A24F 40/51* (2020.01); *H01F 27/30* (2013.01); *H05B 6/06* (2013.01); *H05B 6/105* (2013.01); *H05B 6/36* (2013.01)

(58) Field of Classification Search
USPC ....... 219/634, 600, 606, 628, 620, 260, 263, 219/264, 633
See application file for complete search history.

(56) References Cited

U.S. PATENT DOCUMENTS

| | | | | |
|---|---|---|---|---|
| 2002/0117497 | A1 | 8/2002 | Bassill et al. | |
| 2016/0021930 | A1 | 1/2016 | Minskoff et al. | |
| 2018/0325179 | A1 | 11/2018 | Li et al. | |
| 2019/0313695 | A1* | 10/2019 | Kaufman ............. | A24B 15/167 |
| 2020/0221772 | A1 | 7/2020 | Mironov et al. | |
| 2020/0221775 | A1 | 7/2020 | Mironov et al. | |
| 2020/0245684 | A1 | 8/2020 | Mironov et al. | |

FOREIGN PATENT DOCUMENTS

| | | | |
|---|---|---|---|
| CN | 206808677 | U | 12/2017 |
| CN | 109843097 | A | 6/2019 |
| JP | 1-319289 | A | 12/1989 |
| JP | 2016-164527 | A | 9/2016 |
| JP | 2019-103506 | A | 6/2019 |
| RU | 2 613 785 | C2 | 3/2017 |
| RU | 2 614 376 | C2 | 3/2017 |
| WO | WO 95/27411 | A1 | 10/1995 |
| WO | WO 2015/131058 | A1 | 9/2015 |
| WO | WO 2017/001819 | A1 | 1/2017 |
| WO | WO 2018/073376 | A1 | 4/2018 |
| WO | WO 2018/211035 | A1 | 11/2018 |
| WO | WO 2019/030366 | A1 | 2/2019 |

OTHER PUBLICATIONS

Combined Russian Office Action and Search Report issued Oct. 20, 2023 in Russian Patent Application No. 2022101835/05 (with English Translation), 17 pages.
Extended European Search Report issued Jan. 15, 2020 in European Patent Application No. 19184555.1, 7 pages.
International Search Report and Written Opinion issued Sep. 21, 2020 in PCT/EP2020/068741 filed Jul. 2, 2020, 9 pages.
Japanese Office Action issued Jun. 25, 2024 in Japanese Patent Application No. 2021-577119 (with unedited computer-generated English Translation), 11 pages.
Combined Chinese Office Action and Search Report issued Jul. 27, 2024 in Chinese Patent Application No. 202080046970.9 (with English Translation), 19 pages.

* cited by examiner

INDUCTIVE HEATER ASSEMBLY WITH TEMPERATURE SENSOR

The present invention relates to an inductive heater assembly for an aerosol-generating device. In particular, but not exclusively, one or more embodiments of the present invention may relate to an inductive heater assembly having a temperature sensor which is able to reduce the effects of noise from operating in a varying magnetic field. The present invention also relates to an aerosol-generating device incorporating the inductive heater assembly.

A number of electrically-operated aerosol-generating devices having an electric heater to heat an aerosol-forming substrate, such as a tobacco plug, have been proposed in the art. An aim of such aerosol-generating devices is to reduce known harmful smoke constituents of the type produced by the combustion and pyrolytic degradation of tobacco in conventional cigarettes. Typically, the aerosol-generating substrate is provided as part of an aerosol-generating article which is inserted into a chamber or cavity in the aerosol-generating device. In some known devices, to heat the aerosol-forming substrate to a temperature at which it is capable of releasing volatile components that can form an aerosol, a resistive heating element such as a heating blade is inserted into or around the aerosol-forming substrate when the article is received in the aerosol-generating device.

Other aerosol-generating devices use an inductive heater rather than a resistive heating element. The inductive heater typically comprises an inductor forming part of the aerosol-generating device and a conductive susceptor element arranged such that it is in thermal proximity to the aerosol-forming substrate. The inductor generates a varying magnetic field to generate eddy currents and hysteresis losses in the susceptor element, causing the susceptor element to heat up, thereby heating the aerosol-forming substrate. Inductive heating allows aerosol to be generated without exposing the heater to the aerosol-generating article. This can improve the ease with which the heater may be cleaned.

In aerosol-generating devices, it may be helpful to be able to determine the temperature of the electric heater in order to check that its temperature is not exceeding a temperature at which harmful smoke constituents start to be produced. The measured temperature can also be used to control the amount of power supplied to the heater, for example, as part of a feedback loop, to keep the heater at a target temperature.

Determining the temperature of a resistive heating element is relatively straightforward. For example, a temperature sensor can be used or the resistance of the resistive heating element can be measured and the temperature determined based on a known relationship between temperature and resistance. However, determining the temperature of a susceptor of an inductive heater is more challenging. For example, the susceptor is generally not connected to control circuitry and therefore its resistance cannot be easily measured. Furthermore, using a temperature sensor in a varying magnetic field can introduce a high level of noise into the sensor signal such that the signal is unusable or the determined temperature is inaccurate.

It would be desirable to provide an inductive heater assembly having a temperature sensor which can more accurately determine the temperature of the susceptor and which is less affected by noise.

According to the present disclosure, there is provided an inductive heater assembly for an aerosol-generating device. The inductive heater assembly may comprise at least one inductor coil. The at least one inductor coil may be configured to generate a varying magnetic field when a varying electric current flows through the at least one inductor coil. The inductive heater assembly may comprise at least one susceptor. The at least one susceptor may be arranged to be penetrated by the varying magnetic field generated by the at least one inductor coil to heat the susceptor. The inductive heater assembly may comprise at least one temperature sensor. The at least one temperature sensor may be arranged to determine a temperature of the at least one susceptor. The at least one temperature sensor may comprise a first resistive sensing element and a second resistive sensing element. The first resistive sensing element may be connected to the second resistive sensing element. The first resistive sensing element may be positioned relative to the second resistive sensing element such that a current induced in the first resistive sensing element by the varying magnetic field opposes a current induced in the second resistive sensing element by the varying magnetic field.

According to the present disclosure, there is provided an inductive heater assembly for an aerosol-generating device, the inductive heater assembly comprising: at least one inductor coil configured to generate a varying magnetic field when a varying electric current flows through the at least one inductor coil; at least one susceptor arranged to be penetrated by the varying magnetic field generated by the at least one inductor coil to heat the susceptor; at least one temperature sensor arranged to determine a temperature of the at least one susceptor; wherein the at least one temperature sensor comprises a first resistive sensing element and a second resistive sensing element, wherein the first resistive sensing element is connected to the second resistive sensing element and wherein the first resistive sensing element is positioned relative to the second resistive sensing element such that a current induced in the first resistive sensing element by the varying magnetic field opposes a current induced in the second resistive sensing element by the varying magnetic field.

The temperature sensor of the above-described inductive heater assembly is configured such that a current induced in the first resistive sensing element by the varying magnetic field opposes a current induced in the second resistive sensing element by the varying magnetic field. In other words, the current induced in the second resistive sensing element flows in an opposing direction to the current induced in the first resistive sensing element. Consequently, the magnetic field produced by the second resistive sensing element is substantially equal to and opposes that created by the first resistive sensing element such that the magnetic fields of the first and second resistive sensing elements cancel each other to a significant extent. Accordingly, the self-inductance of the temperature sensor is substantially reduced and the effects of noise from operating the temperature sensor in a varying magnetic field are also reduced. This temperature sensor arrangement assists in improving the accuracy of temperature measurements even when operating in a varying magnetic field.

An inductor coil may have any suitable form. For example, an inductor coil may be a flat inductor coil. A flat inductor coil may be wound in a spiral, substantially in a plane. Preferably, the inductor coil is a tubular inductor coil. Typically, a tubular inductor coil is helically wound about a longitudinal axis. An inductor coil may be elongate. Particularly preferably, an inductor coil may be an elongate tubular inductor coil. An inductor coil may have any suitable transverse cross-section. For example, an inductor coil may have a circular, elliptical, square, rectangular, triangular or other polygonal transverse cross-section.

An inductor coil may be formed from any suitable material. An inductor coil is formed from an electrically conductive material. Preferably, the inductor coil is formed from a metal or a metal alloy.

As used herein, "electrically conductive" refers to materials having an electrical resistivity of less than or equal to $1\times10^{-4}$ ohm metres (Ω·m), at twenty degrees Celsius.

As described herein, a varying electric current may refer to an electric current which varies at a frequency between about 5 kilohertz and about 500 kilohertz. In some embodiments, the varying current is a high frequency varying current. As used herein, the term "high frequency varying current" means a varying current having a frequency of between about 500 kilohertz and about 30 megahertz. The high frequency varying current may have a frequency of between about 1 megahertz and about 30 megahertz, such as between about 1 megahertz and about 10 megahertz, or such as between about 5 megahertz and about 8 megahertz. The varying current may be an alternating current.

As used herein, the term "susceptor" refers to an element comprising a material that is capable of converting magnetic energy into heat. When a susceptor is located in a varying magnetic field, such as the varying magnetic field generated by an inductor coil, the susceptor is heated. Heating of the susceptor may be the result of at least one of hysteresis losses and eddy currents induced in the susceptor, depending on the electrical and magnetic properties of the susceptor material.

A susceptor may comprise any suitable material. The susceptor may be formed from any material that can be inductively heated to a temperature sufficient to release volatile compounds from the aerosol-forming substrate. Preferred susceptors may be heated to a temperature in excess of about 250 degrees Celsius. Preferred susceptors may be formed from an electrically conductive material. Suitable materials for the elongate susceptor include graphite, molybdenum, silicon carbide, stainless steels, niobium, aluminium, nickel, nickel containing compounds, titanium, and composites of metallic materials. Preferred susceptors comprise a metal or carbon. Some preferred susceptors comprise a ferromagnetic material, for example, ferritic iron, a ferromagnetic alloy, such as ferromagnetic steel or stainless steel, ferromagnetic particles, and ferrite. Some preferred susceptors consists of a ferromagnetic material. A suitable susceptor may comprise aluminium. A suitable susceptor may consist of aluminium. A susceptor may comprise at least about 5 percent, at least about 20 percent, at least about 50 percent or at least about 90 percent of ferromagnetic or paramagnetic materials.

Preferably, a susceptor is formed from a material that is substantially impermeable to gases. In other words, preferably, a susceptor is formed from a material that is not gas permeable.

The at least one susceptor of the inductive heater assembly may have any suitable form. For example, a susceptor may be elongate. A susceptor may have any suitable transverse cross-section. For example, a susceptor may have a circular, elliptical, square, rectangular, triangular or other polygonal transverse cross-section. A susceptor may be tubular.

In some preferred embodiments, a susceptor may comprise a susceptor layer provided on a support body. Arranging a susceptor in a varying magnetic field induces eddy currents in close proximity to the susceptor surface, in an effect that is referred to as the skin effect. Accordingly, it is possible to form a susceptor from a relatively thin layer of susceptor material, while ensuring the susceptor is effectively heated in the presence of a varying magnetic field. Making a susceptor from a support body and a relatively thin susceptor layer may facilitate manufacture of an aerosol-generating article that is simple, inexpensive and robust.

The support body may be formed from a material that is not susceptible to inductive heating. Advantageously, this may reduce heating of surfaces of the susceptor that are not in contact with an aerosol-forming substrate, where surfaces of the support body form surfaces of the susceptor that are not in contact with an aerosol-forming substrate.

The support body may comprise an electrically insulative material. As used herein, "electrically insulating" refers to materials having an electrical resistivity of at least $1\times10^{4}$ ohm metres (Ωm), at twenty degrees Celsius.

Forming the support body from a thermally insulative material may provide a thermally insulative barrier between the susceptor layer and other components of an inductive heater assembly, such as an inductor coil circumscribing the inductive heating element. Advantageously, this may reduce heat transfer between the susceptor and other components of an inductive heating system.

The thermally insulative material may also have a bulk thermal diffusivity of less than or equal to about 0.01 square centimetres per second ($cm^2/s$) as measured using the laser flash method. Providing a support body having such a thermal diffusivity may result in a support body with a high thermal inertia, which may reduce heat transfer between the susceptor layer and the support body, and reduce variations in the temperature of the support body.

A susceptor may have any suitable dimensions. A susceptor may have a length of between about 5 millimetres and about 15 millimetres, for example between about 6 millimetres and about 12 millimetres, or between about 8 millimetres and about 10 millimetres. A susceptor may have a width of between about 1 millimetre and about 8 millimetres, for example between about 3 millimetres and about 5 millimetres. A susceptor may have a thickness of between about 0.01 millimetres and about 2 millimetres. Where a susceptor has a constant cross-section, for example a circular cross-section, the susceptor may have a preferable width or diameter of between about 1 millimetre and about 5 millimetres.

The inductive heater assembly may comprise at least one external heating element. The at least one external heating element may comprise the at least one susceptor. As used herein, the term "external heating element" refers to a heating element configured to heat an outer surface of an aerosol-forming substrate. The at least one external heating element may at least partially circumscribe the cavity for receiving the aerosol-forming substrate.

The inductive heater assembly may comprise at least one internal heating element. The internal heating element may comprise the at least one susceptor. As used herein, the term "internal heating element" refers to a heating element configured to be inserted into an aerosol-forming substrate. The internal heating element may be in the form of a blade, a pin, and a cone. The at least one internal heating element may extend into the cavity for receiving the aerosol-forming substrate.

In some embodiments, the inductive heater assembly comprises at least one internal heating element, and at least one external heating element.

The first and second resistive sensing elements may each comprise electrically resistive wires having first and second ends which are arranged adjacent each other along their respective lengths. This arrangement assists in reducing or cancelling the magnetic fields of the first and second resistive sensing elements.

The first and second resistive sensing elements may be formed from platinum, gold, silver, tungsten, nickel, and copper.

The first and second resistive sensing elements may be formed from other suitable electrically resistive materials. Suitable electrically resistive materials include but are not limited to: semiconductors such as doped ceramics, electrically "conductive" ceramics (such as, for example, molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum platinum, gold and silver. Examples of suitable metal alloys include stainless steel, nickel-, cobalt-, chromium-, aluminium-titanium-zirconium-, hafnium-, niobium-, molybdenum-, tantalum-, tungsten-, tin-, gallium-, manganese-, gold- and iron-containing alloys, and super-alloys based on nickel, iron, cobalt, stainless steel, Timetal® and iron-manganese-aluminium based alloys. In composite materials, the electrically resistive material may optionally be embedded in, encapsulated or coated with an insulating material or vice-versa, depending on the kinetics of energy transfer and the external physicochemical properties required.

The first and second resistive sensing elements may be wound together to form a bifilar coil. This has been found to be a particularly effective arrangement for reducing or cancelling the magnetic fields of the first and second resistive sensing elements.

As used herein, the term "bifilar coil" refers to a coil comprising two closely spaced or adjacent parallel windings. The coil may be made from bifilar wire have two closely spaced or adjacent filaments or strands. Alternatively, the coil may be made by winding two separate wires in a closely spaced or adjacent arrangement.

Each turn of the bifilar coil may be spaced apart from its adjacent turn(s). This reduces the magnetic shielding effect of the temperature sensor on the susceptor. The spacing between the turns of the bifilar coil allows the varying magnetic field to pass through the temperature sensor in a less inhibited manner such that the susceptor is penetrated by more of the varying magnetic field. This arrangement is particularly advantageous when the temperature sensor extends along the entire length of the susceptor.

The first and second resistive sensing elements may be electrically connected in series at their respective second ends. This allows current to pass through the second resistive sensing element in an opposing direction to the current passing through the first resistive sensing element.

The first end of each of the first and second resistive sensing elements may be arranged to be connectable to control circuitry. This allows the resistance of the temperature sensor to be determined by the control circuitry.

The temperature sensor may be arranged around at least a portion of an external surface of the susceptor. Preferably, the ratio of the length of the temperature sensor to the length of the susceptor is less than 0.5:1, more preferably less than 0.4:1, more preferably less than 0.3:1, more preferably less than 0.2:1, more preferably less than 0.1:1.

Each turn of the bifilar coil of the temperature sensor may be in contact with its adjacent turn(s). This helps to distribute temperature evenly across the temperature sensor to avoid temperature "hot spots" at particular locations of the sensor.

As used herein, the term "adjacent" is used to mean "alongside", or "next to". This includes arrangements in which the turns are in direct contact as well as arrangements in which two or more of the turns are separated by a gap, such as an air gap or a gap containing one or more intermediate components between adjacent turns.

The temperature sensor may extend along substantially the entire length of the susceptor. This allows an average temperature of the entire susceptor to be determined.

The temperature sensor may be in contact with the susceptor. This provides for improved thermal contact between the temperature sensor and the susceptor.

The temperature sensor further comprises a former around which the bifilar coil is wound. This allows the coil to be formed prior to the time it is incorporated into the inductive heater assembly and may provide for easier manufacturing and assembly. The former may be immune to the varying magnetic field so that it does not affect the magnetic field or shield the susceptor.

The inductive heater assembly may comprises a plurality of inductor coils and wherein a separate temperature sensor is provided for each of the inductor coils. This allows different susceptors or different susceptor regions to be heated at different times or to different temperatures.

The inductive heater assembly may comprise a plurality of susceptors and wherein a separate inductor coil and separate temperature sensor are provided for each of the inductor coils. This allows different susceptors to be heated at different times or to different temperatures.

The inductive heater assembly may comprise a single susceptor and a plurality of inductor coils and corresponding temperature sensors. This allows different susceptor regions to be heated at different times or to different temperatures.

According to the present disclosure, there is provided an aerosol-generating device. The aerosol-generating device may comprise an inductive heater assembly as described above. The aerosol-generating device may comprise control circuitry. The aerosol-generating device may comprise a power source. The control circuitry may be configured to control the supply of electrical current from the power source to the inductive heater assembly to controllably heat the susceptor. The control circuitry may be connected to the at least one temperature sensor of the inductive heater assembly. The control circuitry may be configured to determine the temperature of the susceptor by determining the resistance of the at least one temperature sensor.

According to the present disclosure, there is provided an aerosol-generating device comprising: an inductive heater assembly as described above; control circuitry; and a power source; wherein the control circuitry is configured to control the supply of electrical current from the power source to the inductive heater assembly to controllably heat the susceptor; wherein the control circuitry is connected to the at least one temperature sensor of the inductive heater assembly and is configured to determine the temperature of the susceptor by determining the resistance of the at least one temperature sensor.

As used herein, an "aerosol-generating device" relates to a device that may interact with an aerosol-forming substrate or an aerosol-generating article to generate an aerosol.

As used herein, the term "aerosol-forming substrate" relates to a substrate capable of releasing volatile compounds that may form an aerosol. Such volatile compounds may be released by heating the aerosol-forming substrate.

As used herein, the term "aerosol-generating article" refers to an article comprising an aerosol-forming substrate that, when heated in an aerosol-generating device, releases volatile compounds that can form an aerosol. An aerosol-generating article is separate from and configured for combination with an aerosol-generating device for heating the aerosol-generating article.

The aerosol-forming substrate may comprise nicotine. The nicotine-containing aerosol-forming substrate may be a nicotine salt matrix.

The aerosol-forming substrate may be a liquid. The aerosol-forming substrate may comprise solid components and liquid components. Preferably, the aerosol-forming substrate is a solid.

The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. The aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers may include polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, such as between about 5 percent and about 30 percent by weight on a dry weight basis. The aerosol-forming substrate may comprise other additives and ingredients, such as flavourants.

The at least one temperature sensor may be connected in series with a reference resistor to form a potential divider and wherein an output signal from the at least one temperature sensor is taken from a point of connection between the at least one temperature sensor and the reference resistor. This provides an output signal as a voltage which can be processed by control circuitry, for example, by an analogue to digital converter of a microcontroller.

The at least one temperature sensor may be connected in a Wheatstone bridge arrangement. This provides a highly accurate means for determining the resistance of the temperature sensor.

The control circuitry may further comprise a capacitor to filter the output signal from the at least one temperature sensor to reduce noise in the output signal. This helps to reduce any residual noise in the temperature sensor signal which is not removed by the configuration of the temperature sensor itself.

The capacitor may form part of a low pass filter. The cut-off frequency of the low pass filter can be configured such that it filters out frequencies in the frequency range of the varying magnetic field. The capacitor may be connected in parallel across the reference resistor. The capacitor may be configured to reduce noise in the frequency range of the varying magnetic field.

The capacitance of the capacitor may be in the range of 1 nanofarad to 100 microfarads. Preferably the capacitance is about 10 microfarads or less, more preferably about 1 microfarad or less, more preferably about 100 nanofarads or less, more preferably 94 nanofarads.

The aerosol-generating device may further comprise a cavity for receiving an aerosol-generating article or an aerosol-forming substrate such that the aerosol-generating article or aerosol-forming substrate is in thermal proximity with the inductive heater assembly.

The aerosol-generating device may comprise a device housing. The device housing may at least partially define the cavity for receiving the aerosol-forming substrate or aerosol-generating article. Preferably the cavity for receiving an aerosol-forming substrate or aerosol-generating article is at a proximal end of the device.

Where the susceptor is a tubular susceptor, the tubular susceptor may at least partially define the cavity for receiving the aerosol-forming substrate. When the susceptor comprises a support body, the support body may be a tubular support body and the susceptor layer may be provided on an internal surface of the tubular support body. Providing the susceptor layer on the internal surface of the support body may position the susceptor layer adjacent an aerosol-forming substrate in the cavity for receiving the aerosol-forming substrate, improving heat transfer between the susceptor layer and the aerosol-forming substrate.

The device housing may be elongate. Preferably, the device housing is cylindrical in shape. The device housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the aerosol-generating device is portable. The aerosol-generating device may have a size comparable to a conventional cigar or cigarette. The aerosol-generating device may have a total length between about 30 millimetres and about 150 millimetres. The aerosol-generating device may have an external diameter between about 5 millimetres and about 30 millimetres. The aerosol-generating device may be a handheld device. In other words, the aerosol-generating device may be sized and shaped to be held in the hand of a user.

The aerosol-generating device may comprise a power supply configured to provide a varying current to the inductor coil.

The power supply may be a DC power supply. In preferred embodiments, the power supply is a battery. The power supply may be a nickel-metal hydride battery, a nickel cadmium battery, or a lithium based battery, for example a lithium-cobalt, a lithium-iron-phosphate or a lithium-polymer battery. However, in some embodiments the power supply may be another form of charge storage device, such as a capacitor. The power supply may require recharging and may have a capacity that allows for the storage of enough energy for one or more user operations. For example, the power supply may have sufficient capacity to allow for continuous heating of an aerosol-forming substrate for a period of around six minutes, corresponding to the typical time taken to smoke a conventional cigarette, or for a period that is a multiple of six minutes. In another example, the power supply may have sufficient capacity to allow for a predetermined number of puffs or discrete activations of the aerosol generator. In another example, the power supply may have sufficient capacity to allow for a predetermined number of uses of the device or discrete activations. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The aerosol-generating device may comprise control circuitry or a controller connected to the at least one inductor coil and the power supply. The control circuitry may be configured to control the supply of power to the at least one inductor coil from the power supply. The control circuitry may comprise a microprocessor, which may be a programmable microprocessor, a microcontroller, or an application specific integrated chip (ASIC) or other electronic circuitry capable of providing control. The control circuitry may comprise further electronic components. The control circuitry may be configured to regulate a supply of current to the at least one inductor coil. Current may be supplied to the at least one inductor coil continuously following activation of the aerosol-generating device or may be supplied intermittently, such as on a puff by puff basis.

The control circuitry may advantageously comprise a DC/AC inverter, which may comprise a Class-D or Class-E power amplifier.

The control circuitry may be configured to supply a varying current to the at least one inductor coil. The varying current may be between about 5 kilohertz and about 500 kilohertz. In some embodiments, the varying current is a high frequency varying current, that is, a current between about 500 kilohertz and about 30 megahertz. The high frequency varying current may have a frequency of between about 1 megahertz and about 30 megahertz, such as between about 1 megahertz and about 10 megahertz, or such as between about 5 megahertz and about 8 megahertz.

In some embodiments, the device housing comprises a mouthpiece. The mouthpiece may comprise at least one air inlet and at least one air outlet. The mouthpiece may comprise more than one air inlet. The one or more of the air inlets may reduce the temperature of the aerosol before it is delivered to a user and may reduce the concentration of the aerosol before it is delivered to a user.

In some embodiments, a mouthpiece is provided as part of an aerosol-generating article. As used herein, the term "mouthpiece" refers to a portion of an aerosol-generating system that is placed into a user's mouth in order to directly inhale an aerosol generated by the aerosol-generating system from an aerosol-generating article received by the aerosol-generating device.

The aerosol-generating device may include a user interface to activate the device, for example a button to initiate heating of an aerosol-generating article.

The aerosol-generating device may comprise a display to indicate a state of the device or of the aerosol-forming substrate.

There is also described herein an aerosol-generating system. As used herein, the term "aerosol-generating system" refers to a combination of an aerosol-generating device and one or more aerosol-forming substrates or aerosol-generating articles for use with the device. An aerosol-generating system may include additional components, such as a charging unit for recharging an on-board electric power supply in an electrically operated or electric aerosol-generating device.

The aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco may be referred to herein as a tobacco stick.

The aerosol-generating article may have any suitable form. The aerosol-generating article may be substantially cylindrical in shape. The aerosol-generating article may be substantially elongate. The aerosol-generating article may have a length and a circumference substantially perpendicular to the length.

The aerosol-forming substrate may be provided as an aerosol-generating segment containing an aerosol-forming substrate. The aerosol-generating segment may comprise a plurality of aerosol-forming substrates. The aerosol-generating segment may comprise a first aerosol-forming substrate and a second aerosol-forming substrate. In some embodiments, the second aerosol-forming substrate is substantially identical to the first aerosol-forming substrate. In some embodiments, the second aerosol-forming substrate is different from the first aerosol-forming substrate.

Where the aerosol-generating segment comprises a plurality of aerosol-forming substrates, the number of aerosol-forming substrates may be the same as the number of susceptors in the inductive heating element. Similarly, the number of aerosol-forming substrates may be the same as the number of inductor coils in the inductive heater assembly.

The aerosol-generating segment may be substantially cylindrical in shape. The aerosol-generating segment may be substantially elongate. The aerosol-generating segment may also have a length and a circumference substantially perpendicular to the length.

Where the aerosol-generating segment comprises a plurality of aerosol-forming substrates, the aerosol-forming substrates may be arranged end-to-end along an axis of the aerosol-generating segment. In some embodiments, the aerosol-generating segment may comprise a separation between adjacent aerosol-forming substrates.

In some preferred embodiments, the aerosol-generating article may have a total length between about 30 millimetres and about 100 millimetres. In some embodiments, the aerosol-generating article has a total length of about 45 millimetres. The aerosol-generating article may have an outer diameter between about 5 millimetres and about 12 millimetres. In some embodiments, the aerosol-generating article may have an outer diameter of about 7.2 millimetres.

The aerosol-generating segment may have a length of between about 7 millimetres and about 15 millimetres. In some embodiments, the aerosol-generating segment may have a length of about 10 millimetres, or 12 millimetres.

The aerosol-generating segment preferably has an outer diameter that is about equal to the outer diameter of the aerosol-generating article. The outer diameter of the aerosol-generating segment may be between about 5 millimetres and about 12 millimetres. In one embodiment, the aerosol-generating segment may have an outer diameter of about 7.2 millimetres.

The aerosol-generating article may comprise a filter plug. The filter plug may be located at a proximal end of the aerosol-generating article. The filter plug may be a cellulose acetate filter plug. In some embodiments, the filter plug may have a length of about 5 millimetres to about 10 millimetres. In some preferred embodiments, the filter plug may have a length of about 7 millimetres.

The aerosol-generating article may comprise an outer wrapper. The outer wrapper may be formed from paper. The outer wrapper may be gas permeable at the aerosol-generating segment. In particular, in embodiments comprising a plurality of aerosol-forming substrates, the outer wrapper may comprise perforations or other air inlets at the interface between adjacent aerosol-forming substrates. Where a separation is provided between adjacent aerosol-forming substrates, the outer wrapper may comprise perforations or other air inlets at the separation. This may enable an aerosol-forming substrate to be directly provided with air that has not been drawn through another aerosol-forming substrate. This may increase the amount of air received by each aerosol-forming substrate. This may improve the characteristics of the aerosol generated from the aerosol-forming substrate.

The aerosol-generating article may also comprise a separation between the aerosol-forming substrate and the filter plug. The separation may be about 18 millimetres, but may be in the range of about 5 millimetres to about 25 millimetres.

Features described in relation to one or more examples of the present disclosure may equally be applied to other examples of the invention. In particular, features described in relation to an aerosol-generating system may be equally applied to an aerosol-generating article or aerosol-generating device and vice versa.

Embodiments of the invention will now be described, by way of example only, with reference to the accompanying drawings, in which:

FIG. 8 shows the upper part of the aerosol-generating device of FIG. 7 when the aerosol-generating article is received in the device.

Figure 1:
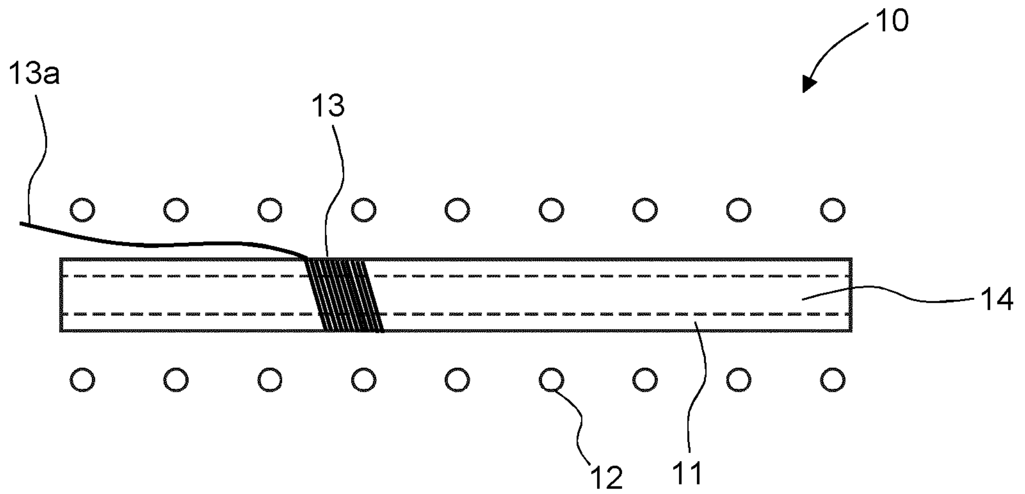
FIG. 1 is a schematic part cross-sectional view of a heater assembly in accordance with an example of the present invention.

FIG. 1 shows an inductive heater assembly 10 comprising a susceptor 11 and an inductor coil 12. The inductor coil 12 is configured to generate a varying magnetic field when a varying electric current flows through the inductor coil 12. The susceptor 11 is arranged relative to the inductor coil 12 in such a way that the susceptor 11 is heatable by penetration of the varying magnetic field that may be generated by the inductor coil 12. The susceptor 11 is configured to heat an aerosol-forming substrate. Put another way, when the susceptor 11 is heated by penetration of the varying magnetic field, the aerosol-forming substrate may be heated by the susceptor. The aerosol-forming substrate heatable by the susceptor may be received in a cavity 14 of the inductive heater assembly 10. In the example of FIG. 1, the susceptor 11 is a tubular susceptor 11 which defines a cavity 14 for receiving an aerosol-forming substrate.

A temperature sensor 13 is provided in thermal contact or proximity with the susceptor 11 at a location along the length of the susceptor. As a result, the temperature sensor 13 may be used to measure the temperature of the susceptor 11. The temperature sensor 13 is a resistive temperature sensor that changes resistance as function of it temperature. The resistance of the temperature sensor 13 increases with increasing temperature in accordance with a known or determinable relationship. By measuring the resistance of the temperature sensor 13, the temperature of the temperature sensor 13 can be determined based on the relationship between temperature and resistance, which provides an indication of the temperature of the susceptor 11.

The temperature sensor 13 is in the form of a bifilar coil of copper wire which is wound around the susceptor 11. The copper wire is approximately 60 μm in diameter and each turn of the bifilar coil touches its adjacent turn(s). The copper wire is insulated or enameled to prevent electrically shorting between turns. The temperature sensor 13 is approximately 4.5 mm in length and surrounds around ten percent of the length of the susceptor 11. The internal diameter of the temperature sensor 13 is approximately 7.2 mm. The free end 13*a* of the bifilar coil of the temperature sensor 13 extends out of the heater assembly 10 such that it can be connected to control circuitry (not shown).

Figure 2:
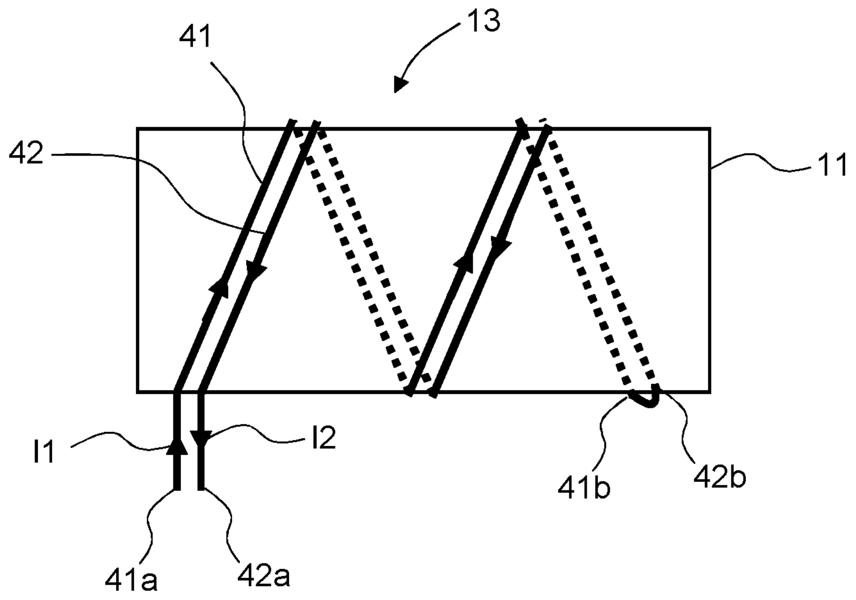
FIG. 2 is an enlarged and simplified view of a temperature sensor of a heater assembly in accordance with an example of the present invention.

FIG. 2 shows an enlarged and simplified view of the temperature sensor 13 of the heater assembly 10 of FIG. 1. For clarity, only a couple of turns of the bifilar coil are shown. The temperature sensor comprises a first 41 and second 42 resistive sensing elements which are arranged adjacent each other along their respective lengths and are wound together into a bifilar coil around the susceptor 11. The first 41 and second 42 resistive sensing elements have first ends 41*a*, 42*a* respectively and second ends 41*b*, 42*b* respectively. The first 41 and second 42 resistive sensing elements are electrically connected in series at their respective second ends 41*b*, 42*b*. The first ends 41*a*, 41*b* may be used to connect the temperature sensor 13 to control circuitry (not shown).

A current I1 induced in the first resistive sensing element 41 by the varying magnetic field generated by the inductor coil 12 opposes a current I2 induced in the second resistive sensing element 42 by the varying magnetic field. As can be seen from FIG. 2, the current I2 induced in the second resistive sensing element 42 flows in an opposing direction to the current I1 induced in the first resistive sensing element 41. Consequently, the magnetic field produced by the second resistive sensing element 42 is substantially equal to and opposes that created by the first resistive sensing element 41 such that the magnetic fields of the first 41 and second 42 resistive sensing elements cancel each other to a significant extent. Accordingly, the self-inductance of the temperature sensor 13 is substantially reduced and the effects of noise from operating the temperature sensor in a varying magnetic field are also reduced. The temperature sensor 13 is therefore able to accurately determine temperature even when operating in the varying magnetic field.

Figure 3:
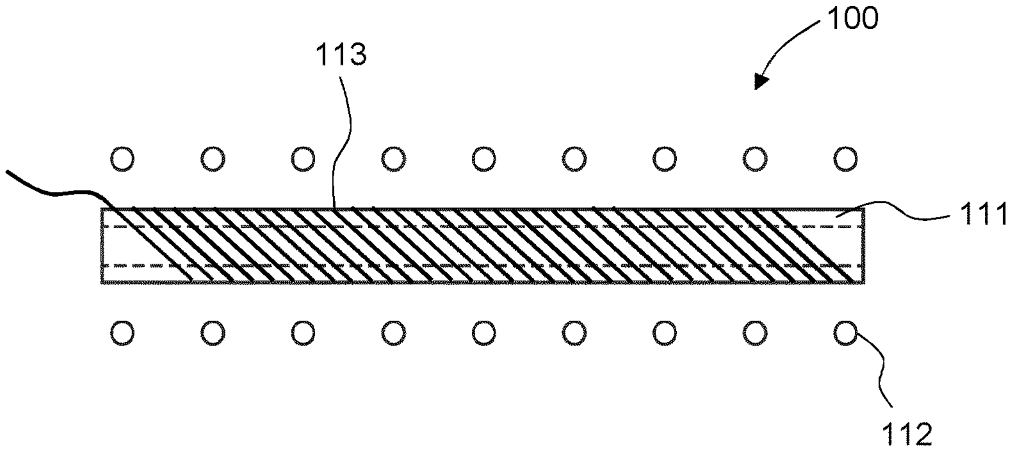
FIG. 3 is a schematic part cross-sectional view of a heater assembly comprising a temperature sensor in accordance with another example of the present invention.

FIG. 3 shows a heater assembly 100 according to a different example of the present invention. The heater assembly 100 is substantially the same as the heater assembly 10 of FIG. 1 and comprises a susceptor 111, an inductor coil 112 and a temperature sensor 113 in the form of a bifilar coil. The only difference in this arrangement is that the turns of the bifilar coil are spaced apart and the temperature sensor extends along substantially the entire length of the susceptor 111. In this example, the spacing between the turns of the bifilar coil assist in reducing shielding of the susceptor 111 from the varying magnetic so that the susceptor 111 is penetrated by the varying magnetic field. In other words, the spacing between the turns of the bifilar coil allow the varying magnetic field to pass through the temperature sensor 113 to the susceptor 111.

Figure 4:
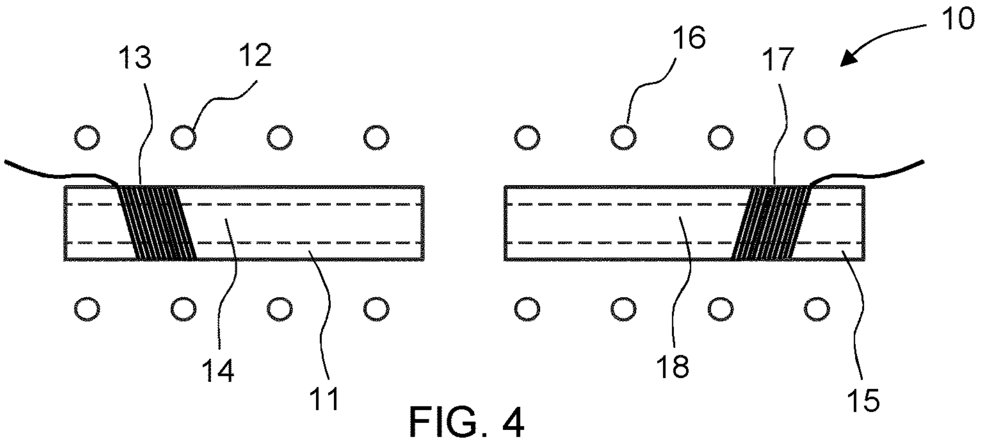
FIG. 4 is a schematic part cross-sectional view of a heater assembly in accordance with another example of the present invention.

FIG. 4 shows an inductive heater assembly 10 comprising a first susceptor 11 and a second susceptor 15. The inductive heater assembly 10 also comprises a first inductor coil 12 and a second inductor coil 16. The first inductor coil 12 is configured to generate a first varying magnetic field when a first varying electric current flows through the first inductor coil 12. The second inductor coil 16 is configured to generate a second varying magnetic field when a second varying electric current flows through the second inductor coil 16. The first susceptor 11 is arranged relative to the first inductor coil 12 in such a way that the first susceptor 11 is heatable by penetration of the first varying magnetic field. The second susceptor 15 is arranged relative to the second inductor coil 16 in such a way that the second susceptor 15 is heatable by penetration of the second varying magnetic field. Therefore, when the first susceptor 11 is heated by penetration of the first varying magnetic field, an aerosol-forming substrate (not shown) located within the first susceptor 11 may be heated by the first susceptor 11. Likewise, when the second susceptor 15 is heated by penetration of the second varying magnetic field, an aerosol-forming substrate (not shown) located within the second susceptor 15 may be heated by the second susceptor 15.

The inductive heater assembly 10 of FIG. 4 comprises a first temperature sensor 13 and a second temperature sensor 17. The first 13 and second 17 temperature sensors of FIG. 4 are the same as the temperature sensor 13 of FIGS. 1 and 2. The first temperature sensor 13 is provided in thermal contact with the first susceptor 11. As a result, the first temperature sensor 13 may be used to measure the temperature of the first susceptor 11. The second temperature sensor 17 is provided in thermal contact with the second susceptor 15. As a result, the second temperature sensor 17 may be used to measure the temperature of the second susceptor 15.

In the example of FIG. 4, the first susceptor 11 is a tubular susceptor, which defines a first portion 14 of a cavity for receiving an aerosol-forming substrate. Likewise, the second susceptor 15 is also a tubular susceptor, which defines a second portion 18 of a cavity for receiving an aerosol-forming substrate.

The arrangement of FIG. 4 enables selective heating of the first susceptor 11 and the second susceptor 15. Such selective heating enables the inductive heater assembly 10 to heat different portions of an aerosol-forming substrate at different times when an aerosol-forming substrate is received in the first 14 and second 18 portions of the cavity. Furthermore, the arrangement of FIG. 4 may enable one of the susceptors 11, 15 to be heated to a different temperature than the other susceptor 15, 11. Such temperatures may be advantageously measured by using the temperature sensors 13 and 17.

Figure 5:
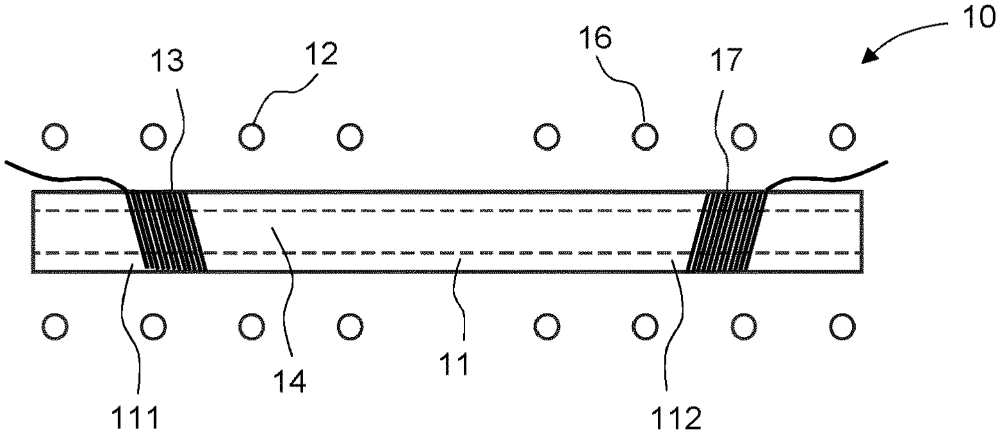
FIG. 5 is a schematic part cross-sectional view of a heater assembly in accordance with another example of the present invention.

FIG. 5 shows an inductive heater assembly 10 comprising a single susceptor 11 having a first region 111 and a second region 112. The inductive heater assembly 10 also comprises a first inductor coil 12 and a second inductor coil 16. The first inductor coil 12 is configured to generate a first varying magnetic field when a first varying electric current flows through the first inductor coil 12. The second inductor coil 16 is configured to generate a second varying magnetic field when a second varying electric current flows through the second inductor coil 16. The first region 111 is arranged relative to the first inductor coil 12 in such a way that the first region 111 is heatable by penetration of the first varying magnetic field. The second region 112 is arranged relative to the second inductor coil 16 in such a way that the second region 112 is heatable by penetration of the second varying magnetic field. Therefore, when the first region 111 is heated by penetration of the first varying magnetic field, an aerosol-forming substrate (not shown) located within the first region 111 may be heated by the first region 111. Likewise, when the second region 112 is heated by penetration of the second varying magnetic field, an aerosol-forming substrate (not shown) located within the second region 112 may be heated by the second region 112.

The inductive heater assembly of FIG. 5 comprises a first temperature sensor 13 and a second temperature sensor 17. The first 13 and second 17 temperature sensors of FIG. 5 are the same as the temperature sensor 13 of FIGS. 1 and 2. The first temperature sensor 13 is provided in thermal contact with the first region 111. As a result, the first temperature sensor 13 may be used to measure the temperature of the first region 111. The second temperature sensor 17 is provided in thermal contact with the second region 112. As a result, the second temperature sensor 17 may be used to measure the temperature of the second region 112.

In the arrangement of FIG. 5, the susceptor 11 is a tubular susceptor, the tubular susceptor defining a cavity 14 for receiving an aerosol-forming substrate. The inductive heater assembly 10 of FIG. 5 enables selective heating of the first region 111 and the second region 112. Such selective heating enables the inductive heater assembly 10 to heat different portions of an aerosol-forming substrate at different times, when an aerosol-forming substrate is received in the cavity 14. Furthermore, the inductive heater assembly 10 of FIG. 5 may enable one of the regions 111, 112 to be heated to a different temperature than the other region 112, 111. Such temperatures may be advantageously measured by using the temperature sensors 13 and 17.

Figure 6:
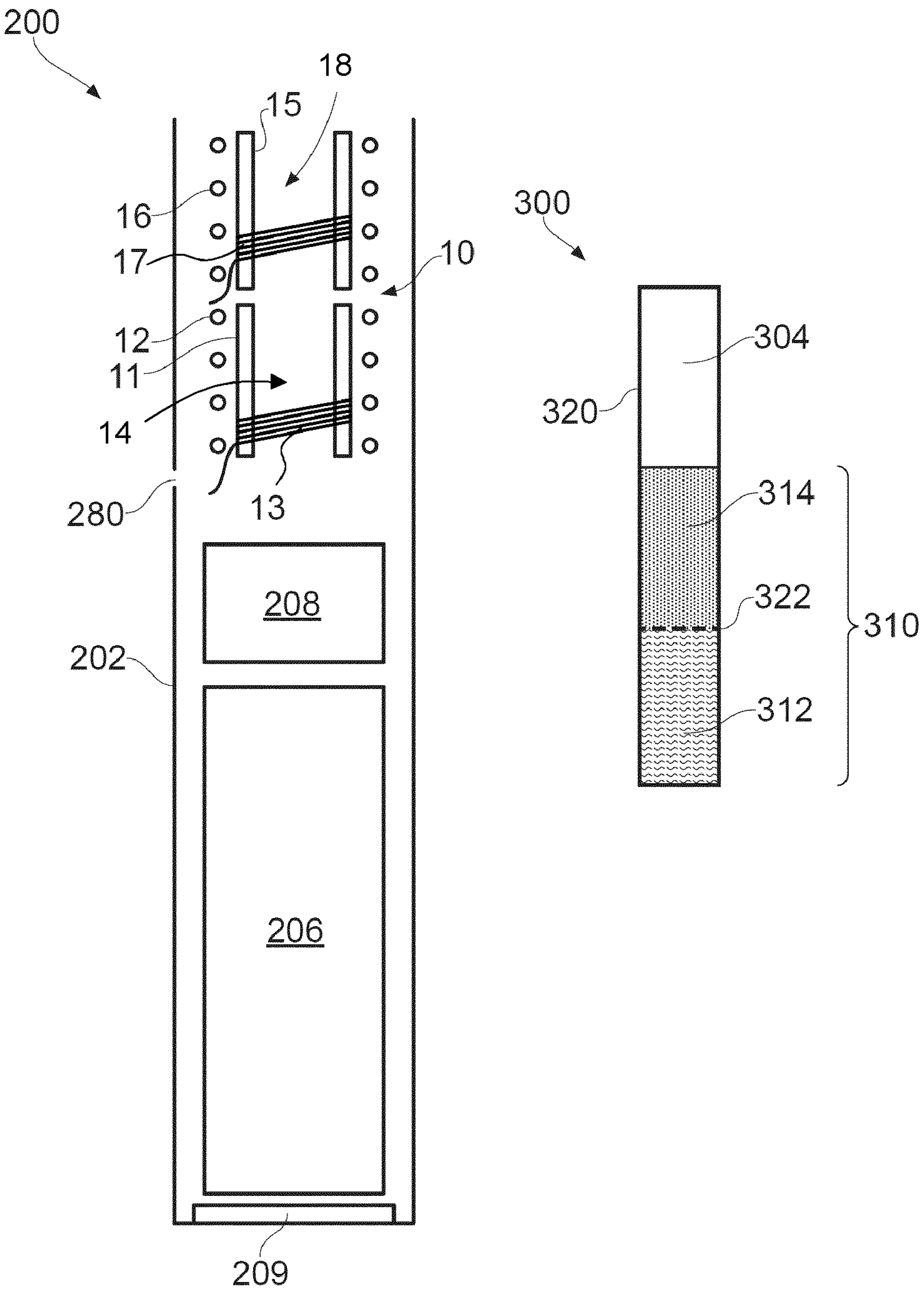
FIG. 6 is a schematic part cross-sectional view of an aerosol-generating device in accordance with another example of the present invention and an aerosol-generating article for use in the device.

FIG. 6 shows schematic cross-sections of an aerosol-generating device 200 and an aerosol-generating article 300 for use with the aerosol-generating device 200. Together, the aerosol-generating article 300 and aerosol-generating device 200 comprise an aerosol-generating system.

The aerosol-generating device 200 comprises a substantially cylindrical device housing 202, with a shape and size similar to a conventional cigar. The aerosol-generating device 200 further comprises a power supply 206, in the form of a rechargeable battery, control circuitry 208 including a microcontroller, an electrical connector 209, and the above described inductive heater assembly 10. In the example of FIG. 6, the inductive heater assembly 10 is similar to that of FIG. 4. However, other inductive heater assemblies may be used. In particular, inductive heater assemblies comprising one inductor coil and one susceptor may be used. Alternatively, inductive heater assemblies comprising more than two inductor coils and more than two susceptors may be used. In a preferred alternative, inductive heater assemblies comprising one susceptor, two inductor coils and two temperature sensors may be used; in particular, the inductive heater assembly of FIG. 5 can be used.

The power supply 206, control circuitry 208 and inductive heater assembly 10 are all housed within the device housing 202. The inductive heater assembly 10 of the aerosol-generating device 200 is arranged at the proximal end of the device 200. The electrical connector 209 is arranged at a distal end of the device housing 202.

As used herein, the term "proximal" refers to a user end, or mouth end of the aerosol-generating device or aerosol-generating article. The proximal end of a component of an aerosol-generating device or an aerosol-generating article is the end of the component closest to the user end, or mouth end of the aerosol-generating device or the aerosol-generating article. As used herein, the term "distal" refers to the end opposite the proximal end.

The control circuitry 208 is configured to control the supply of power from the power supply 206 to the inductive heater assembly 10. The control circuitry 208 further comprises a DC/AC inverter, including a Class-D power amplifier. The control circuitry 208 is also configured to control recharging of the power supply 206 from the electrical connector 209. The control circuitry 208 further comprises a puff sensor (not shown) configured to sense when a user is drawing on the aerosol-generating device.

The inductive heater assembly 10 comprises a first inductor coil 12 and a second inductor coil 16. The inductive heater assembly 10 also comprises a first susceptor 11 and a second susceptor 15. As described with reference to FIG. 4, the first susceptor 11 is a tubular susceptor, which defines a first portion 14 of the cavity for receiving an aerosol-forming substrate. Likewise, the second susceptor 15 is a tubular susceptor, which defines a second portion 18 of the cavity for receiving the aerosol-forming substrate. The first 12 and second 16 inductor coils are also tubular in the example of FIG. 6, and they are disposed concentrically around, respectively, the first susceptor 11 and the second susceptor 15.

The first inductor coil 12 is connected to the control circuitry 208 and the power supply 206, and the control circuitry 208 is configured to supply a first varying electric current to the first inductor coil 12. When the first varying electric current is supplied to the first inductor coil 12, the first inductor coil 12 generates a first varying magnetic field, which heats the first susceptor 11 by induction.

The second inductor coil 16 is connected to the control circuitry 208 and the power supply 208, and the control circuitry 208 is configured to supply a second varying electric current to the second inductor coil 16. When the second varying electric current is supplied to the second inductor coil 16, the second inductor coil 16 generates a second varying magnetic field, which heats the second susceptor 15 by induction.

The inductive heater assembly 10 comprises a first temperature sensor 13 in thermal contact with the first susceptor 11. The inductive heater assembly 10 comprises a second temperature sensor 17 in thermal contact with the second susceptor 15. The first 13 and second 17 temperature sensors may be used to respectively measure the temperatures of the first susceptor 11 and the second susceptor 15 as described with reference to FIG. 4.

The device housing 202 also defines an air inlet 280 in close proximity to the distal end of the first portion 14 of the cavity for receiving the aerosol-forming substrate. The air inlet 280 is configured to enable ambient air to be drawn into the device housing 202.

The aerosol-generating article 300 shown in FIG. 6 is generally in the form of a cylindrical rod having a diameter similar to the inner diameter of the cavity 14, 18 for receiving the aerosol-forming substrate. The aerosol-generating article 300 comprises a cylindrical cellulose acetate filter plug 304 and a cylindrical aerosol-generating segment 310 wrapped together by an outer wrapper 320 of cigarette paper.

The filter plug 304 is arranged at a proximal end of the aerosol-generating article 200, and forms the mouthpiece of the aerosol-generating system, on which a user draws to receive aerosol generated by the system.

The aerosol-generating segment 310 is arranged at a distal end of the aerosol-generating article 300, and has a length substantially equal to the combined length of the first 14 and second 18 portions of the cavity. The aerosol-generating segment 310 comprises a plurality of aerosol-forming substrates, including: a first aerosol-forming substrate 312 at a distal end of the aerosol-generating article 300 and a second aerosol-forming substrate 314 at a proximal end of the aerosol-generating segment 310, adjacent the first aerosol-forming substrate 312. It will be appreciated that in some embodiments two or more of the aerosol-forming substrates may be formed from the same materials. However, in this embodiment, each of the aerosol-forming substrates 312, 314 is different. The first aerosol-forming substrate 312 comprises a gathered and crimped sheet of homogenised tobacco material, without additional flavourings. The second aerosol-forming substrate 314 comprises a gathered and crimped sheet of homogenised tobacco material including a flavouring in the form of menthol. In other examples, an aerosol-forming substrate may comprise a flavouring in the form of menthol, and not comprise tobacco material or any other source of nicotine. Each of the aerosol-forming substrates 312, 314 may also comprise further components, such as one or more aerosol formers and water, such that heating the aerosol-forming substrate generates an aerosol with desirable organoleptic properties.

The proximal end of the first aerosol-forming substrate 312 is exposed, as it is not covered by an outer wrapper 320. The outer wrapper 320 comprises a line of perforations 322 circumscribing the aerosol-generating article 300 at the interface between the first aerosol-forming substrate 312 and the second aerosol-forming substrate 314. The perforations 322, enable air to be drawn into the aerosol-generating segment 310.

In the example of FIG. 6, the first aerosol-forming substrate 312 and the second aerosol-forming substrate 314 are arranged end-to-end. However, it is envisaged that in other embodiments, a separation may be provided between the first aerosol-forming substrate 312 and the second aerosol-forming substrate 314.

Figure 7:
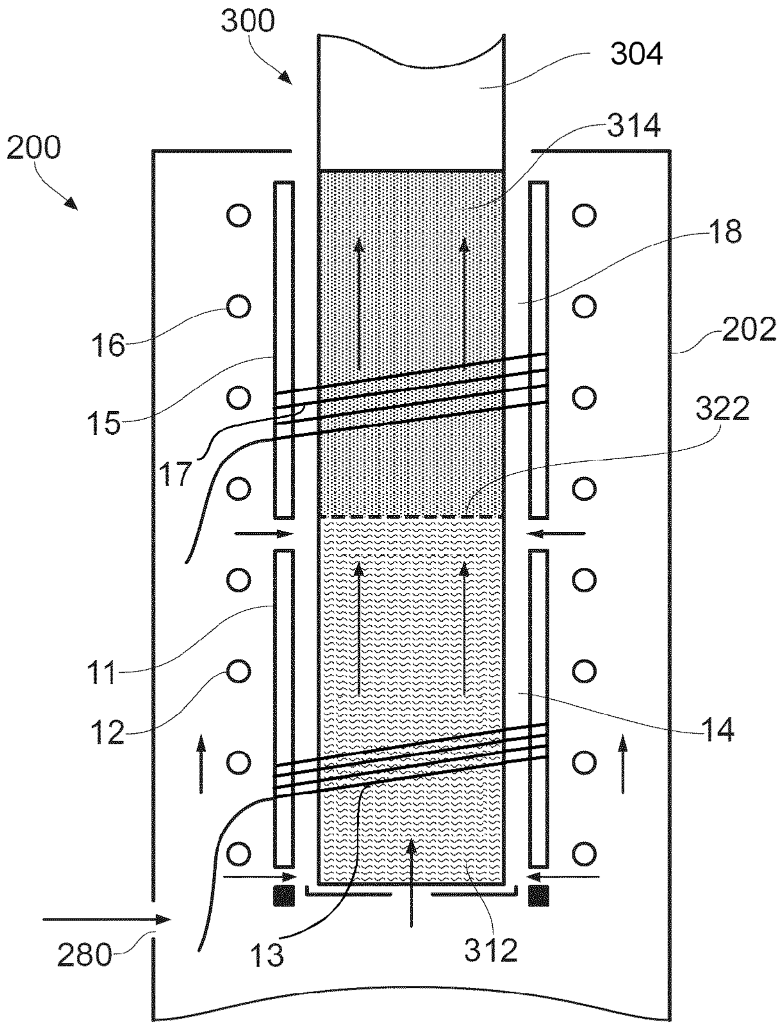

FIG. 7 shows an enlarged view of the proximal end of the aerosol-generating device 200 of FIG. 6 in which the aerosol-generating article 300 has been received. The aerol-generating article 300 is received such that the first aerosol-forming substrate 312 is located with the first portion 14 of the cavity and the second aerosol-forming substrate 314 is located within the second portion 18 of the cavity.

In use, a user draws on the filter plug 304 which in turn draws air through air inlet 280 which is detected by the puff detector (not shown). In response, the control circuitry (not shown in FIG. 7) activates one or more of inductor coils 12 and 16 to heat one or more of susceptors 11 and 15 which causes an aerosol to be generated from one or more of the first 312 and second 314 aerosol-forming substrates. Air flows from the air inlet 280 through the aerosol-generating device 200 and aerosol-generating article 300 along defined airflow pathways (denoted by straight arrows in FIG. 7). The generated aerosol is entrained in the airflow, which passes out of the aerosol-generating article 300 through filter 304 and into the mouth of a user.

Figure 8A:
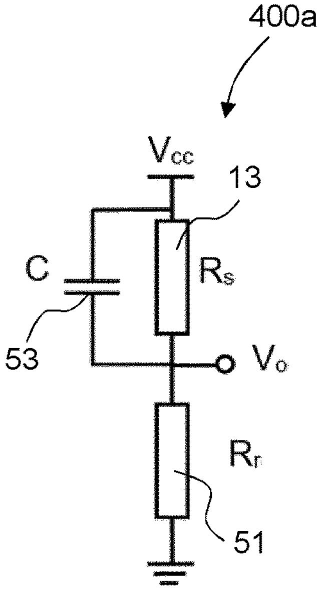
FIGS. 8A to 8C show various filter circuits for an aerosol-generating device in accordance with another example of the present invention for filtering.
Figure 8B:
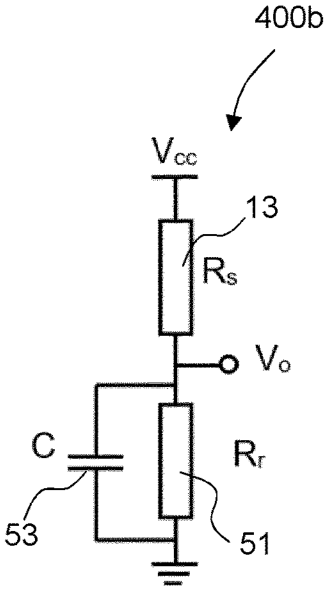
Figure 8C:
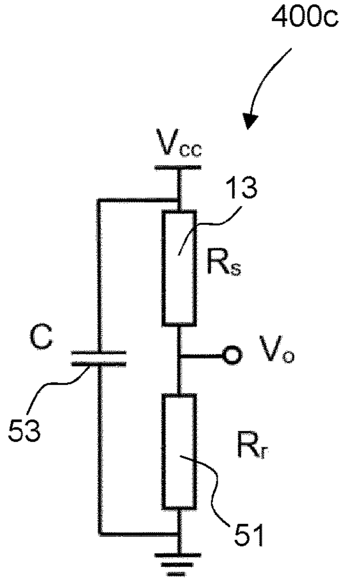

FIGS. 8A to 8C show various filter circuits 400*a* to 400*c* for filtering the signal produced by the temperature sensor 13 of the above-described inductive heater assemblies 10 when operating in a varying magnetic field. The filter circuits 400*a* to 400*c* assist in reducing residual noise which is not removed by the bifilar arrangement of the temperature sensor 13.

In each of the filter circuits 400*a* to 400*c*, the temperature sensor 13 having a resistance Rs is placed in series with a reference resistor 51 having a known resistance Rr. In the examples of FIGS. 8A to 8C, the reference resistor 51 has a value of 100 ohms. The temperature sensor 13 and reference resistor 51 form a potential divider between a supply voltage Vcc and ground. An output signal or voltage Vo is taken from the point of connection between temperature sensor 13 and reference resistor 51.

Each of the filter circuits 400*a* to 400*c* also comprises a capacitor 53 having a capacitance C to assist with filtering out residual noise from the varying magnetic field. The capacitor 53 combines with the reference resistor 51 to form a low pass filter to filter out noise in the frequency range of the varying magnetic field, i.e. between 5 kHz and 500 kHz or higher. A filter circuit based on the example of FIG. 8B using a capacitor 53 having a capacitance C of 94 nF has been found to be particularly effective at reducing residual noise in the signal.

Figure 9:
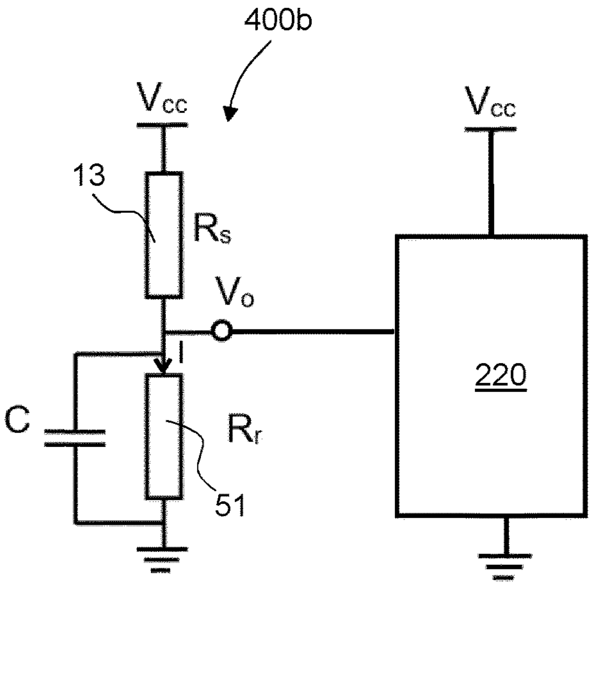
FIG. 9 shows the filter circuit of FIG. 8B connected to a microcontroller.

FIG. 9 shows the filter circuit 400*b* of FIG. 8B connected to a microcontroller 220 which forms part of the control circuitry 208 of FIG. 6. The microcontroller 220 can be used to determine the resistance Rs of temperature sensor 13 by determining output voltage Vo using a built-in analogue to digital converter. Once output voltage Vo has been determined, the microcontroller can calculate resistance Rs as follows.

The current I through reference resistor 51 is equal to Vo divided by Rr (that is, I=Vo/Rr). The current I through temperature sensor 13 is equal to the difference between the supply voltage Vcc and output voltage Vo divided by the resistance Rs of temperature sensor 13 (that is I=(Vcc−Vo)/Rs). Given that the current I through temperature sensor 13 is equal to the current I through reference resistor 51, equating and rearranging the two foregoing equations gives an equation for the resistance Rs:

$$Rs=Rr\times(Vcc-Vo)/Vo$$

Once Rs has been determined, the temperature of the temperature sensor 13 and hence the susceptor can be determined by applying a function relating temperature and resistance or using a look up table of resistance and corresponding temperature values.

In tests, the temperature sensor 13 of FIG. 1 was shown to have a nominal resistance of 10.5 ohm at 23° C. and to have a temperature coefficient of resistance of 0.00288 $K^{-1}$ (compared to a theoretical value for Cu: 0.00386 $K^{-1}$). It exhibited an approximately linear relationship between temperature and resistance over the temperature range 0 to 200° C.

The invention claimed is:

1. An inductive heater assembly for an aerosol-generating device, the inductive heater assembly comprising:

at least one inductor coil configured to generate a varying magnetic field when a varying electric current flows through the at least one inductor coil;

at least one susceptor arranged to be penetrated by the varying magnetic field generated by the at least one inductor coil to heat the susceptor;

at least one temperature sensor arranged to determine a temperature of the at least one susceptor, wherein the at least one temperature sensor comprises a first resistive sensing element and a second resistive sensing element, wherein the first resistive sensing element is connected to the second resistive sensing element, and wherein the first resistive sensing element is positioned relative to the second resistive sensing element such that a current induced in the first resistive sensing element by the varying magnetic field opposes a current induced in the second resistive sensing element by the varying magnetic field, and wherein the first and the second resistive sensing elements each comprise resistive wires having first and second ends and are arranged adjacent each other along their respective lengths, the first and the second resistive sensing elements being wound together to form a bifilar coil.

2. The inductive heater assembly according to claim 1, wherein each turn of the bifilar coil is spaced apart from its adjacent turns.

3. The inductive heater assembly according to claim 1, wherein the first and the second resistive sensing elements are electrically connected in series at their respective second ends.

4. The inductive heater assembly according to claim 1, wherein the temperature sensor is arranged around at least a portion of an external surface of the susceptor.

5. The inductive heater assembly according to claim 4, wherein a length of the temperature sensor is less than fifty percent of a length of the susceptor.

6. The inductive heater assembly according to claim 4, wherein the temperature sensor extends along substantially an entire length of the susceptor.

7. The inductive heater assembly according to claim 1, wherein the temperature sensor is in contact with the susceptor.

8. The inductive heater assembly according to claim 1, further comprising a plurality of inductor coils, wherein a separate temperature sensor is provided for each of the inductor coils.

9. An aerosol-generating device, comprising:

an inductive heater assembly according to claim 1;

control circuitry; and a power source, wherein the control circuitry is configured to control a supply of electrical current from the power source to the inductive heater assembly to controllably heat the susceptor, and wherein the control circuitry is connected to the at least one temperature sensor of the inductive heater assembly and is configured to determine a temperature of the susceptor by determining a resistance of the at least one temperature sensor.

10. The aerosol-generating device according to claim 9, wherein the at least one temperature sensor is connected in series with a reference resistor to form a potential divider, and wherein an output signal from the at least one temperature sensor is taken from a point of connection between the at least one temperature sensor and the reference resistor.

11. The aerosol-generating device according to claim 10, wherein the control circuitry further comprises a capacitor to filter an output signal from the at least one temperature sensor to reduce noise in the output signal.

12. The aerosol-generating device according to claim 11, wherein the capacitor is connected in parallel across the reference resistor.

13. The aerosol-generating device according to claim 11, wherein the capacitor is configured to reduce noise in the frequency range of the varying magnetic field.

* * * * *